United States Patent [19]

Leithaeuser et al.

[11] Patent Number: 4,853,038

[45] Date of Patent: Aug. 1, 1989

[54] PROCESS FOR THE PREPARATION OF LOW VISCOSITY AQUEOUS DISPERSION OF GLYCEROL ESTERS OF LONG-CHAIN FATTY ACIDS, AND THEIR USE

[75] Inventors: Horst Leithaeuser; Dirk Reese; Walter Trautmann, all of Marl, Fed. Rep. of Germany

[73] Assignee: Huels Aktiengesellschaft, Marl, Fed. Rep. of Germany

[21] Appl. No.: 60,787

[22] Filed: Jun. 12, 1987

[30] Foreign Application Priority Data

Jun. 14, 1986 [DE] Fed. Rep. of Germany ....... 3620037

[51] Int. Cl.$^4$ .............................................. C08L 95/00
[52] U.S. Cl. .................................... 106/243; 106/244; 252/312
[58] Field of Search .............................. 106/243–244, 106/8, 9, 180, 266; 252/312; 426/602; 514/529

[56] References Cited

U.S. PATENT DOCUMENTS

| | | | |
|---|---|---|---|
| 2,108,214 | 2/1938 | Shuger | 106/9 |
| 2,109,842 | 3/1938 | Harris | 426/602 |
| 2,542,019 | 2/1951 | Fisher | 252/312 |
| 2,819,199 | 1/1958 | Kalish | 514/529 |
| 4,252,796 | 2/1981 | Yu | 514/178 |

OTHER PUBLICATIONS

"Chemistry of Organic Compounds" Noller, C. pp. 209, 212 and 217.

*Primary Examiner*—Theodore Morris
*Attorney, Agent, or Firm*—Millen, White & Zelano

[57] ABSTRACT

The invention relates to the preparation of low-viscosity aqueous dispersions of glycerol esters of long-chain fatty acids by dispersing under mechanical agitation in the aqueous phase, wherein the starting material is constituted by soap-free glycerol esters having a content of less than 2% by weight of free glycerol esters, a content is set of 0.5–6% by weight of alkali soaps of long-chain fatty acids. The dispersions are utilized for the coating of expandable finely divided styrene polymers.

14 Claims, No Drawings

PROCESS FOR THE PREPARATION OF LOW VISCOSITY AQUEOUS DISPERSION OF GLYCEROL ESTERS OF LONG-CHAIN FATTY ACIDS, AND THEIR USE

BACKGROUND OF THE INVENTION

Glycerol esters of long-chain fatty acids are conventionally used as coating agents for expandable, finely divided styrene polymers. The glycerol esters are mixed in powder form by pug milling with the polymers (DE-B No. 23 60 901) or used as a solution, or an aqueous dispersion or oganosol (cf., inter alia, DE No. 29 32 321, DE No. 33 17 69 and the state of the art cited therein). In many cases, the glycerol esters have also been employed together with other coating media, such as calcium stearate, magnesium stearate, or zinc stearate, or bis-stearylethylenediamine.

The commercially available glycerol esters (partial glycerides) used as coating agents are mixtures of mono-, di-, and triglycerol esters with a high proportion of monoesters (monoglycerides). The 1-monoester content is usually between 35 and 45% by weight, but can also be up to 90%. The proportions of triesters (triglycerides) in the commercial products varies; this proportion is about 9% and generally does not exceed 15% by weight. Higher triglyceride contents, however, can be conveniently provided. The pure triglycerides are inexpensive commercial products.

The commercially available glycerol esters (partial glycerides) used as coating media preferably contain stearic acid as the fatty acid and, depending on type of manufacture and composition, 0-6% by weight of free glycerol. They are divided into self-emulsifiable (se) and non-self-emulsifiable types (nse). The self-emulsifiable, soap-containing glycerol esters contain potassium soap or sodium soap and normally a higher proportion of free glycerol (up to 6%) than the non-self-emulsifiable types. These soap-containing glycerol esters are used, inter alia, for the production of aqueous dispersions; they have the drawback that the viscosity of the dispersions produced therefrom fluctuates widely among batches shipped. Therefore, the agitating installations, for example, must be designed with a considerable safety margin in the manufacture of the aqueous dispersions. This makes handling more difficult and impairs economy; thus, concentrations of 20% by weight, for example, can usually not be exceeded, due to viscosity considerations.

These difficult conditions also apply to dispersions containing, besides the self-emulsifiable glycerol esters, the metallic soaps zinc stearate or magnesium stearate. Such aqueous dispersions are advantageously used for coating the surface of expandable, finely divided styrene polymers since uniform coatings can be attained without significant problems. In particular, in those cases where metallic soaps are also to be applied in addition to glycerol esters, the use of dispersions likewise containing the metallic soap ensures that all finely divided styrene polymers receive the metallic soap and the glycerol ester in the desired ratio.

The non self-emulsifiable glycerol esters are soap-free. Their content of free glycerol is below 2% especially below 1.5% by weight. They cannot be used in their existing form for the production of aqueous dispersions.

SUMMARY OF THE INVENTION

It is an object of the invention to provide aqueous dispersions of glycerol esters of long-chain fatty acids exhibiting a low viscosity, which viscosity remains the same from one batch to the next.

Upon further study of the specification and appended claims, further objects and advantages of this invention will become apparent to those skilled in the art.

These objects have been attained by providing a process for the preparation of low-viscosity aqueous dispersion of glycerol esters of long-chain fatty acids by dispersion under mechanical agitation in the aqueous phase, characterized by starting with soap-free glycerol esters of long-chain fatty acids having a free glycerol content of less than two percent by weight and a monoglyceride proportion of less than 55%, and setting a content of 0.5-6% by weight of alkali soaps of long-chain fatty acids, based on the glycerol esters.

DETAILED DISCUSSION

Accordingly, starting materials are soap-free, e.g., having less than 0.1% by weight of soaps e.g., of potassium or sodium soaps, and are non self-emulsifiable glycerol esters of long-chain saturated carboxlyic acids, having 10-26 carbon atoms. Preferred are the naturally occuring acids of 14-18 carbon atoms.

The commercial products made from natural fatty acids which contain as the acid component exclusively even-numbered fatty acids of the chain length $C_{16}$–$C_{18}$, especially stearic acid, are especially preferred.

The free-glycerol content in these esters is greatly below 2, preferably below 1.5% by weight. The ratio of mono-, di-, and triesters can be varied within wide limits and is exclusively dependent on the desired usage. The proportion of monoglycerides, however, generally ranges below 55%, preferably being 3-45% and especially 35-45%. Mixtures of commercially available monoesters and triesters and/or diesters, said mixtures containing the aforementioned content of monoesters, can likewise be used.

It is also possible to employ triglycerides, especially tristearates, i.e., glycerol esters having a 0% proportion of monoesters.

Preferably, inexpensive, substantially soap-free distearates or mono/distearate mixtures with 1-monoester contents of 35% to 45% are used as dispersions to coat finely divided, expandable styrene polymers. Their free glycerol content is 0-1.5% by weight. A suitable mixture component is 90% strength glycerol monostearate, available commercially.

Suitable expandable styrene polymers are described in U.S. Pat. Nos. 3 480 570, 3 789 028, 4 281 036, 4 238 570, British Pat. Nos. 1 409 285, 1 497 319, and 1 408 267, which disclosures are incorporated by reference herein. The coating procedures, which are conventional, being described in the above-mentioned references.

Expandable polystrene polymers are polystyrene particles, impregnated with a low boiling hydrocarbon, like pentane. These particles are coated to prevent conglomeration during prefoaming, to get bigger uniform particles. In the second stage of foaming there are produced blocks or shaped articles.

The application of the dispersion to the finely divided, expandable styrene polymers can also be conducted by successively applying aqueous dispersions having varied compositions onto the surface of the expandable styrene polymers so that the desired composition is obtained.

Production of the low-viscosity, aqueous dispersions of the glycerol esters can take place according to several methods:

METHOD A

A commerical, non self-emulsifiable glycerol ester (nse) is combined with a self-emulsifiable (se) type, and then the mixture is dispersed in water having a temperature of about 65°–90° C. The thus-attainable viscosities, though, are generally higher than in the two methods B and C described below. Also, the glycerol content is still relatively high. This method is less suited for producing aqueous dispersions as coating media for expandable, finely divided styrene polymers.

In an example 20 parts by weight of a mixture comprising a non self-emulsifiable glycerol ester (4–14 parts by weight) and a self-emulsifiable glycerol ester (16–6 parts by weight) are dispersed in 80 parts by weight of water having a temperature of 70°–85° C.

After stirring for 30 minutes there is obtained a homogenous paste exhibiting a viscosity of 200–300 mPa.s, measured at 80° C. (after 1 hour).

7 kg of foamable polystyrene particles are coated with this paste in a mixer. The particles are dried at room temperature in a vacuum. Afterwards the particles are prefoamed without pressure in a commercial prefoamer.

METHOD B

The starting material is an nse glycerol ester which is partially saponified by added a defined amount of KOH or NaOH at about 65°–90° C., preferably 75°–85° C. This economical method B, however, has the drawback that the composition and the glycerol content of the nse glycerol ester fluctuate, so that this method is less preferred for producing aqueous dispersions for coating expandable, finely divided styrene polymers.

In an example 200 parts by weight of a non self-emulsifiable glycerol ester are dispersed in 800 parts by weight of water having a temperature of 70°–85° C. To this dispersion there is added 0,4–2,0 g KOH.

After stirring for 30 minutes there is obtained a paste exhibiting a viscosity of <5 mPa.s, measured at 80° C. This paste is used for coating of foamable polystyrene particles like method A.

METHOD C

This method is advantageously used for the manufacture of low-visocisty aqueous dispersions of glycerol esters for the coating of expandable, finely divided styrene polymers. Under agitation, the water-insoluble or, respectively, the mixture of water-insoluble nse glycerol esters and optionally the other metallic soaps are introduced into a hot solution of the alkali metal soap of long-chain fatty acids having a temperature of 65°–90° C., preferably 75°–85° C.

In an example 200 parts by weight of a non self-emulsifiable glycerol ester are dispersed, e.g. together with 20 parts by weight of a non water soluble metal soap (like zinc stearate), in a solution of 4 parts by weight of potassium stearate in 800 (780) parts by weight of water, having a temperature of 75°–85° C.

After stirring for 30 to 60 minutes a paste is obtained. If it is free of zinc stearate, the paste exhibits a viscosity between 100 and 10 mPa.s (at 80° C.), having a concentration of glycerol ester optionally between 20 and 50% by weight.

The pastes containing zinc stearate exhibit high viscosity between 300 and 800 mPa s (measured at 80° C. after 1 hour, as can be seen in table 2, No. 10 and 11).

The dispersions are stable and of such low viscosity that no problems are encountered in preparing dispersions having solids contents of 5%–50%, preferably 15–40% by weight.

The proportions of alkali metal soaps of long-chain fatty acids in the aqueous dispersions generally ranges from 0.5% to 6%, preferably from 1 to 4% by weight, based on the total glycerol ester content.

If the pastes are used in a period of 1-2 hours, the concentrations of alkali metal soap can be low. For longer storage or in the presence of metal soaps like zinc stearate the concentration of alkali metal soap should be higher.

The acid component results, in methods A and B, from the added soap-containing proportion and respectively, from the partially saponified glycerol ester.

In method C, the acid component as well as the cation of the soap can advantageously be selected. Potassium stearate is preferably used.

Other usable alkali metal soaps include, for example, sodium stearate, sodium or potassium palmitate, sodium or potassium laureate or oleate. They are suitably produced from free acid and NaOH or KOH by introduction into the quantity of water heated to 65°–90° C., preferably 75°–85° C.

Preferred long-chain fatty acids have 10–24 carbon atoms, more preferred are the naturally occuring fatty acids with 14–18 carbon atoms.

Zinc, magnesium or calcium stearate are, if desired, additionally employed as further metallic soaps, as is customary. These additional metallic soaps can also be added in Method A and B.

The coating processes, except as otherwise noted, are fully conventional as disclosed in the references (U.S. Patents and Bristish Patents) mentioned on page 4. The coating agent ist used generally in a concentration between 0,05 and 0,6% by weight, optionally between 0,1 and 0,5% by weight, the paste being added to the expandable polystyrene particles placed in a mixer. The particles are coated by the paste; the water of the paste is evaporated.

Without further elaboration, it is believed that one skilled in the art can, using the preceding description; utilize the present invention to its fullest extent. The following preferred specific embodiments are, therefore, to be construed as merely illustrative, and limitative of the remainder of the disclosure in any way whatsoever.

In the foregoing and in the following examples, all temperatures are set forth uncorrected in degree Celsius and unless otherwise indicated, all parts and percentages are by weight.

The entire text of all application, patents and publications, if any, cited above and below are hereby incorporated by reference.

EXAMPLES

Typically low viscosities achievable by this invention are lower than 120 optionally 65 mPa.s for the pastes free of metal stearate. The viscosities of the pastes containing metal stearate are lower than 800 mPa.s, optionally lower than 500 mPa.s. The tables set out below represent a compilation of the results of comparative tests and tests.

Table 1 contains the comparative tests (V) of the state of the art. The commercial products employed are soap-containing glycerol monodistearates having proportions of 40–45% of 1-monoglyceride (monoester). It can be seen that the viscosity of the this-prepared dispersion fluctuates greatly. The dispersions are obtained by introducing 120 g of the soap-containing glycerol monodistearate into 480 g of fully demineralized water heated to 80° C. under agitation at 350 rpm. The dispersions are stable and homogeneous, but they exhibit an excessively high viscosity that fluctuates from one batch to the next.

Table 2 shows the tests according to this invention. The starting materials are soap-free glycerol monodistearates commercially available which likewise have a proportion of 40–45% of 1-monoglyceride (monoester). Examples 1, 2 and 3 have been produces according to methods A and B; all other examples and comparative examples have been produced according to method C. Example 13 shows that pure triglycerides can still be used under certain conditions. Comparative examples V3 and V4 clarify that pure monoglycerides, or mixtures with monoester proportion of more than 55%, are not usable for the production of low-viscosity aqueous dispersions.

TABLE 1

480 g of fully demineralized water is heated to 80° C. and 120 g of glycerol monodistearate is added under agitation (350 rpm). The viscosity of the dispersion is measured after varying time periods (see table).

| Glycerol Monodistearate (se Type) | Contains Type of Soap | Conc. Based on Glycerol Ester | Conc. of Dispersion | Viscosity (m.Pas) at 80° C. After | | | | Remarks |
|---|---|---|---|---|---|---|---|---|
| | | | | 30' | 60' | 300' | 24 h | |
| V1 Commercial Product 1 | K Stearate | app. 6% | 20% | 920 | 710 | 415 | 110 | Shipment 1 |
| V1a 1a | | | 20% | Not Measurable | 1550 | 1460 | 830 | Shipment 2 |
| V2 Commercial Product 2 | Na Stearate | app. 5% | 20% | Not Measurable, Viscosity Too High | | | | |
| | | | 15% | | | 1680 | 1370 | |
| | | | 10% | | 720 | 680 | 660 | |

TABLE 2

Preparation Analogously to the Tests in Table 1

| No. | Glycerol nse Type | Monodistearate se Type | Type of Soap | Conc. of Soap | Soap Added | Conc. of Dispersion | Viscosity (m.Pas) at 80° C. After | | g H₂O | Remarks |
|---|---|---|---|---|---|---|---|---|---|---|
| | | | | | | | 60' | 300' | | |
| 1 | Comm. Prod. 3 (40 g) | Comm. Prod. 1 (80 g) | K Stearate | app. 4% | se Type | 20% | 230 | 60 | 480 | Method A |
| 2 | Comm. Prod. 3 (120 g) | — | 0.36 g KOH | app. 1.76% | part. sapon. | 20% | 6 | 5.5 | | Method B |
| 3 | Comm. Prod. 3 (120 g) | — | 0.5 g KOH | app. 2.9% | " | 20% | 20.5 | 14.5 | | Method B |
| 4 | Comm. Prod. 4 (120 g) | — | 2.4 g K Stear. | app. 2% | Receiver | 20% | 6 | 5 | 478 | — |
| 5 | Comm. Prod. 4 (120 g) | — | 4.8 g K Stear. | app. 4% | " | 20% | 15 | 10 | 476 | — |
| 6 | Comm. Prod. 4 (120 g) | — | 7.2 g K Stear. | app. 6% | " | 20% | 62 | 33 | 473 | — |
| 7 | Comm. Prod. 4 (180 g) | — | 7.2 g K Stear. | app. 4% | " | 30% | 18 | 16 | 413 | — |
| 8 | Comm. Prod. 4 (300 g) | — | 6 g K Stear. | app. 2% | " | 50% | 19 | 17 | 294 | — |
| 9 | Comm. Prod. 3 (300 g) | — | 1.5 g K Stear. | app. 0.5% | " | 50% | 36 | 34 | 299 | — |
| 10 | Comm. Prod. 3 (120 g) | — | 4.8 g K Stear. | app. 4% | " | 20% | 397 | 392 | 464 | +12 g Zn Stearate |
| 11 | Comm. Prod. 3 (240 g) | — | 4.8 g K Stear. | app. 2% | " | 40% | 725 | 715 | 332 | +24 g Zn Stearate |
| 12 | Comm Prod. 3 (120 g) + Triglyceride (120 g) | — | 4.8 g K Stear. | app. 2% | " | 40% | 95 | 89 | 356 | — |
| 13 | Triglyceride (240 g) | — | 4.8 g K Stear. | app. 2% | Receiver | 40% | 9 | 7 | 356 | -(*) |
| V3 | Monoglyceride (240 g) | — | 4.8 g K Stear. | app. 2% | " | 40% | Not Measured | | 356 | Too Viscous |
| V4 | Comm. Prod. 3 (96 g) + Monoglyceride (96 g) + Triglyceride (48 g) | — | 9.6 g K Stear. | app. 4% | " | 40% | Not Measured | | 350 | Too Viscous |
| 14 | Comm. Prod. 4 (120 g) | — | Na Stear. | app. 2% | " | 20% | 6 | 5 | 480 | — |
| 15 | Comm. Prod. 4 | — | Na | app. 2% | " | 20% | 5.5 | 4.5 | 480 | |

TABLE 2-continued

Preparation Analogously to the Tests in Table 1

| No. | Glycerol nse Type | Monodistearate se Type | Type of Soap | Conc. of Soap | Soap Added | Conc. of Dispersion | Viscosity (m.Pas) at 80° C. After 60' | Viscosity (m.Pas) at 80° C. After 300' | g H$_2$O | Remarks |
|---|---|---|---|---|---|---|---|---|---|---|
| 16 | Comm. Prod. 4 (120 g) | — | Palmit. Na Laurate | app. 2% | " | 20% | 6 | 5.5 | 480 | |
| 17 | Comm. Prod. 4 (120 g) | — | Na Oleate | app. 2% | " | 20% | 5 | 4.5 | 480 | |

(*) Stable only while agitator is running.

The preceding examples can be repeated with similar success by substituting the generically or specifically described reactants and/or operating conditions of this invention for those used in the preceding examples.

From the foregoing descriptions, one skilled in the art can easily ascertain the essential characteristics of this invention, and without departing from the spirit and scope thereof, can make various changes and modifications of the invention to adapt it to various usages and conditions.

What is claimed is:

1. A process for the preparation of low-viscosity aqueous dispersions of glycerol stearates of long-chain fatty acids, comprising using a starting concentration based on the total amount of said glycerol stearates in said dispersions of 0.5–6% by weight of an alkali metal soap of a long-chain fatty acid in a starting solution of an effective amount of an essentially soap-free glycerol stearate containing less than 55% of monoglyceride and less than 2% of free glycerol, based on the total amount of said glycerol stearates in said dispersions.

2. A process according to claim 1, wherein the total amount of said glycerol stearates in said dispersions is 10–50%.

3. A process according to claim 1, wherein the glycerl stearate comprises a mixture of mono-, di- and triglycerides.

4. A process according to claim 1, wherein the soap is an alkali metal soap of $C_{10}$–$C_{24}$-fatty acid.

5. A process according to claim 1, wherein the stearate is a distearate having a monoester content of about 35–45%.

6. An aqueous dispersion produced by the process of claim 1.

7. An aqueous dispersion comprising an effective amount of a substantially soap-free glycerol stearate having a free glycerol content of less than 2% by weight and a content of 0.5–0.6 % by weight, based on said ester, of an alkali metal soap of a long chain fatty acid.

8. A dispersion according to claim 7, wherein the glycerol stearate is a mixture of mono-, di- and triglycerides.

9. A dispersion according to claim 7, wherein the amount of tristearate is 20–5%.

10. A dispersion according to claim 7, wherein the stearate is a distearate having a monoester content of about 28–45%.

11. A dispersion according to claim 7, wherein the soap is an alkali metal soap of a $C_{14}$–$C_{18}$-fatty acid.

12. A dispersion according to claim 7, wherein the stearate is a distearate having a monoester content of about 35–45%.

13. A process according to claim 1, wherein the total amount of said glycerol stearates in said dispersion is 20–40%.

14. A process according to claim 1, wherein the viscosity of the dispersion is 100 mPa(s) or less at 80° C. after 300 minutes.

* * * * *